Oct. 23, 1934.  R. THOMAS  1,977,782
TORCH TIP CONSTRUCTION
Filed June 5, 1931
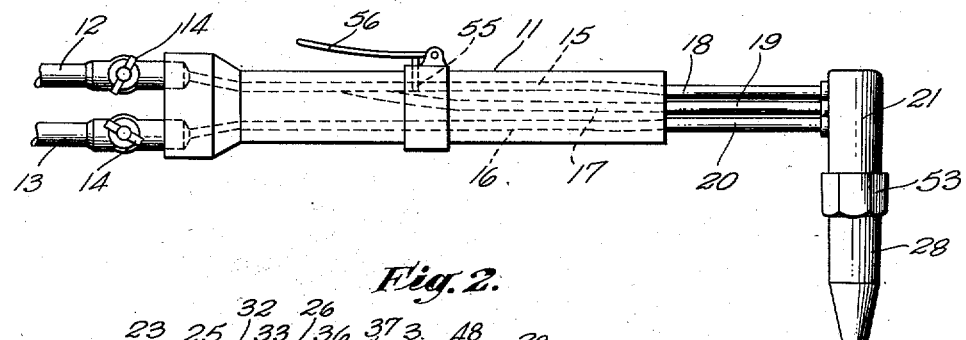
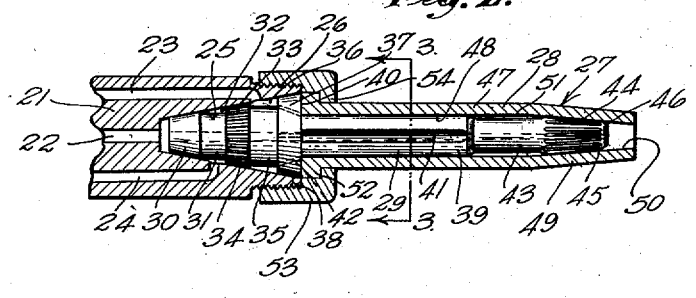
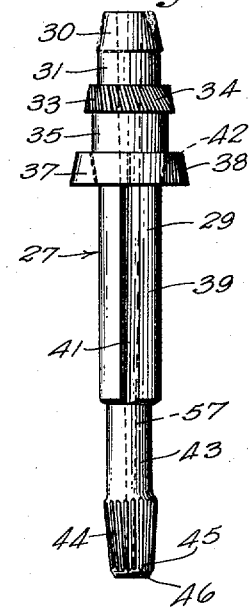
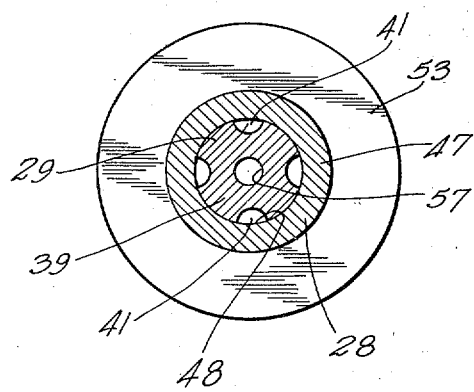
INVENTOR:
ROY THOMAS
BY
ATTORNEY.

Patented Oct. 23, 1934

1,977,782

UNITED STATES PATENT OFFICE 1,977,782

TORCH TIP CONSTRUCTION

Roy Thomas, Los Angeles, Calif.

Application June 5, 1931, Serial No. 542,288

7 Claims. (Cl. 153—27.4)

My invention relates to torches, and more particularly to a torch tip.

In the use of a cutting torch to preheat the work to be cut, or in the use of a welding torch, it is necessary to secure an intimate mixture of the combustible and combustion supporting gases in order to secure the most effective heating flame. It is a corresponding purpose of my invention to provide a torch tip adapted for very intimately mixing the combustion supporting gas with the combustible gas.

It is likewise desirable in heating work for welding or cutting to direct the flame in a stream of small cross-sectional area so that an extremely high temperature may be secured. It is thus an object of my invention to provide a torch tip which will so direct the combustible and combustion supporting gases as to provide a flame having a small cross-sectional area.

It is a further object of my invention to provide a tip of the class described which effectively prevents any backfire beyond the torch tip.

If the combustible and combustion supporting gases are discharged within the torch tip so that the wall of the tip may be utilized in directing the stream of mixed gases, there is a marked tendency for this wall of the tip to become heated to a dangerous temperature. It is another object of my invention to provide a torch tip of the class described which will not become heated to an unsafe temperature due to the combustion of gases within the tip.

It is still another object of my invention to provide a torch tip of the class described which comprises a small number of parts and which is positive in operation and economical in manufacture.

The preferred embodiment of my invention which is capable of accomplishing the foregoing objects and others, some of which will be made evident hereinafter, is illustrated in the accompanying drawing in which Fig. 1 is an elevational view of the torch tip of my invention.

Fig. 2 is a sectional view of the torch tip of my invention.

Fig. 3 is an enlarged sectional view taken as indicated by the line 3—3 of Fig. 2.

Fig. 4 is an elevational view of the inner member of the torch tip.

Referring to the drawing, and particularly to Fig. 1, the numeral 11 indicates a torch handle which is provided at one end with a supply tube 12 for a combustion supporting fluid such as oxygen, and a supply tube 13 for a combustible fluid such as a hydrocarbon gas. Each of the tubes 12 and 13 is provided with a valve 14 controlling the passage of gas through the tubes 12 and 13. Formed in the handle 11 is an upper passage 15 communicating with the oxygen supply tube 12, and a lower passage 16 communicating with the supply tube 13 for the hydrocarbon gas. Likewise formed in the handle 11 and communicating with the oxygen passage 15 is an intermediate passage 17. Attached to the forward end of the handle 11 is an upper oxygen delivery tube 18, a lower oxygen delivery tube 19, and a delivery tube 20 for the combustible gas. The delivery tubes 18, 19, and 20 communicate with the passages 15, 17, and 16, respectively, and are attached to a head member 21.

The head member 21 provides a central cylindrical passage 22 which communicates with the upper oxygen delivery tube 18. Likewise formed in the head member 21 is a passage 23 communicating with the delivery tube 20 for the combustible gas, and a passage 24 communicating with the lower oxygen delivery tube 19. As illustrated in Fig. 2, the end of the head member 21 is provided with a central frusto-conical cavity 25 of a larger diameter at its outer end than at its inner end. Formed on the periphery of the head member 21 and at the end thereof, are threads 26 for a purpose to be later described.

Disposed in the frusto-conical cavity 25 of the head member 21 is one end of the tip 27. The tip 27 includes an outer member 28 and an inner member 29. The inner member 29 is provided at its rearward end with a tapered sealing surface 30 adapted to contact with fluid-tight engagement the wall of the cavity 25. Formed on the inner member 29 in front of the tapered sealing surface 30 is a cylindrical portion 31 cooperating with the wall of the cavity 25 to define an oxygen chamber 32. Formed on the inner member 29 of the tip 27 in front of the cylindrical portion 31 is a grooved tapered portion 33. The tapered portion 33 may be provided with grooves forming passages each of which is in a plane with the axis of the tip 27, as illustrated in Fig. 2, or two series of grooves crossing each other and angularly related to the longitudinal axis of the tip 27. These grooves may be formed in a smooth surface or across threads cut in the tapered portion 33. In the preferred embodiment of my invention, as illustrated in Fig. 4, the tapered portion 33 is provided with grooves forming passages 34, said passages being inclined to the axis of the inner member 29, and none of said passages 34 being in a plane including said axis. The tapered portion 33 is of the same slope as the wall of the cavity 25 and engages the wall 25. The inner member 29 of the tip 27 provides in front of the tapered portion 33 a cylindrical portion 35 which cooperates with the wall of the cavity 25 in defining a mixing chamber 36.

Formed on the inner member 29 of the tip 27 in front of the cylindrical portion 35, is an annular flange 37 providing a sealing surface 38 adapted to engage the wall of the cavity 25 with a fluid-tight contact. Extending forwardly from the flange 37 is a shank 39 of a diameter considerably less than the diameter of the flange 37 and separated therefrom by a shoulder 40. Formed in the surface of the shank 39 is a plurality of semi-cylindrical passages 41 illustrated in Fig. 3 as 4 in number.

The passages 41 communicate with the mixing chamber 36 through passages 42 formed through the flange 37. The passages 41 terminate at their forward end in a reduced portion 43 of the shank 39. The reduced portion 43 extends to a frusto-conical portion 44 which tapers forwardly. Provided in the frusto-conical portion 44 of the inner member 29 is a plurality of discharge passages 45. The forward end of the inner member 29 is tapered, as indicated by the numeral 46 in Figs. 2 and 4, the slope of the taper 46 being greater than the slope of the tapered portion 44 and extending for about one-sixteenth of an inch longitudinally of the tip 27.

The outer member 28 of the tip 27 comprises a cylindrical portion 47 having a cylindrical bore 48 and a tapered portion 49 having a forwardly tapered bore 50. The bore 48 of the cylindrical portion 47 is substantially equal to the diameter of the shank 39 of the inner member 29 so that gas is permitted to pass between the shank 39 and the cylindrical portion 47 of the outer member 28 only through the passages 41. The cylindrical portion 47 of the outer member 28 cooperates with the reduced portion 43 of the inner member 29 in defining a chamber 51. The wall of the tapered bore 50 of the outer member 28 cooperates with the tapered portion 44 of the inner member 29 so that gas may pass therebetween only through the passages 44. The tapered portion 49 of the outer member 28 extends beyond the forward end of the inner member 29 for a distance variable between one-eighth and three-sixteenths of an inch.

Formed on the rearward end of the outer member 28 of the tip 27 is an annular flange 52. The flange 52 is of a diameter substantially equal to the diameter of the flange 37 of the inner member 29. Disposed upon the outer member 28 of the tip 27 is a collar or nut 53 having an inwardly extending annular rim 54 adapted to engage the flange 52 of the outer member 28. The collar 53 is provided with internal threads adapted to engage the threads 26 of the head member 21 so that the collar 53 may retain the tip 27 in its proper position relative to the head member 21, as illustrated in Fig. 2.

In the use of my invention, oxygen is supplied through the supply pipe 12 and a combustible gas, such as acetylene, is provided to the supply pipe 13. The valves 14 being open, the oxygen and acetylene gas pass from the supply tubes to the passages 15 to 17, inclusive, of the handle 11. A valve 55 is provided in the oxygen passage 15, this valve being operable by a lever 56 associated with the handle 11. If the valve 55 be closed, oxygen passes from the supply tube 12 through the passage 17 to the passage 24 formed in the head member 21. As illustrated in Fig. 2, the passage 24 communicates with the oxygen chamber 32 provided in the head member 21. From the oxygen chamber 32 the oxygen passes through the passages 34 of the tapered portion 33 of the inner member 29 into the mixing chamber 36. Inasmuch as the passages 34 are extremely small and communicate with the mixing chamber 36 at an angle, it should be apparent that the flow will set up a considerable turbulence in the mixing chamber 36.

The combustible gas from the passage 16 of the handle 11 is delivered through the delivery tube 20 and the passage 23 of the head member 21 to the mixing chamber 36 where it is intimately mixed by this turbulence with the oxygen. The mixed gases pass from the combustion chamber 36 through the passages 42 and the passages 41 to the chamber 51 between the inner member 29 and the outer member 28 of the tip 27. From the chamber 51 the mixed gases are discharged through the passages 45 formed in the surface of the inner member 29 and pass out of the forward end of the outer member 28 of the tip 27. The extension of the outer member 28 beyond the forward end of the inner member 29, and the taper of the bore 50 of this extension, serve to direct the mixed gases when discharged to a small area of the work so that a small flame of high temperature results.

When it is desired to begin the cutting operation the handle 56 is manipulated so that the valve 55 is opened and oxygen is permitted to pass from the upper oxygen passage 15 of the handle 11 through the delivery tube 18 and the central passage 22 into a tapered central cylindrical passage 57 formed in and extending throughout the length of the inner member 29 of the torch tip 27. The oxygen discharged from the forward end of the inner member 29, due to the extension of the outer member 28 beyond the end of the inner member 29, and due to the taper of this extension, is directed in a stream of small cross-sectional area to a limited part of the work so that a small flame of intensely high temperature results.

The taper 46 at the forward end of the inner member 29 of the tip 27 aids in delivering the discharge gas in a stream of small cross-sectional area beyond the end of the tip 27. Moreover, the taper 46 provides a greater length of the outer member 28 which is effective in directing the mixed gases in a uniform stream while preventing the heating of this portion of the outer member 28 due to combustion within the tip 27. The gas discharged from the passages 45 is discharged as a plurality of circumferentially spaced, substantially cylindrical jets. These jets, following their discharge from the passages 45 and their contact with the atmosphere, tend to expand inwardly and outwardly radially of the tip 27. The taper 46 of the inner member 29 and the extending tapered portion 49 of the outer member 28 cooperate to prevent to a large extent the expansion of the gas outwardly radially of the tip 27 and to a lesser extent inwardly radially of the tip 27, so that the numerous jets are converged into one conical jet. The taper 46 prevents turbulence within the extending tapered portion of the outer member 28, which turbulence would be more favorable to combustion within the extending tapered portion of the outer member 28. Moreover, the taper 46, by virtue of its small radial distance from the wall 50 of the extending tapered portion of the member 28, resists flame propagation between the taper 46 and the wall 50, insures a high velocity of the gas passing between the tapered portion 46 and the wall 50, which also resists flame propagation therein, and thus permits the employment of a longer extension of the member 28 beyond the ends of the passages 45 without detrimental heating of the extension of the member 28 than would be possible if the inner member 29 ended at the ends of the passages 45. This longer extension of the outer member 28 beyond the ends of the passages 45 is of benefit in preventing the dispersion of the gas outwardly radially of the tip 27 and in better providing a gas stream of small cross-sectional area converging at a point in front of the tip 27.

It should be apparent that the passages 34 through which the oxygen enters the mixing chamber 36 by causing the oxygen to enter the mixing chamber 36 in extremely small jets and at an angle to the axis of the tip 27, create a turbulence within the mixing chamber 36 which effects a most intimate mixture of the combustible and the combustion supporting gases.

It should likewise be apparent that the torch tip of my invention is extremely simple in construction and economical of manufacture.

While that embodiment of my invention has been described in which the mixing chamber is provided in a torch tip, it should be apparent that a mixing chamber identical in construction may be provided in the handle 11 or between the handle 11 and the head 21 and that the mixed gas may be led from such a mixing chamber to the torch tip. Such a construction in which the mixing chamber is separated from the torch tip is especially applicable to welding torches.

While I have described the use of the preferred embodiment of my invention with such gases as oxygen and acetylene, it should be obvious that my invention may likewise be utilized with other combustion supporting and combustible gases.

Therefore, while the preferred embodiment of my invention hereinbefore illustrated and described is fully capable of performing those objects and providing those advantages primarily stated, there are various other embodiments of my invention likewise capable of performing these objects and providing these advantages, and I therefore wish my invention to be understood as not restricted to that embodiment hereinbefore set forth.

I claim as my invention:

1. In a torch tip, the combination of: a head member; an inner member having means cooperating with said head member in the provision of a receiving chamber and a mixing chamber with passages therebetween inclined relative to the axis of said inner member, none of said passages being in a plane which includes said axis; and an outer member connected to said head member, one of said inner and outer members having grooves cooperating with the surface of the other of such members in forming passages converging throughout a portion of their length, said inner member having passages therein connecting said mixing chamber and said discharge passages, and said discharge passages terminating within said outer member, said inner member projecting within said outer member beyond the ends of said discharge passages.

2. In a torch tip, the combination of: a head member; an inner member having means cooperating with said head member in the provision of a receiving chamber and a mixing chamber with passages therebetween, said passages being inclined relative to the axis of said inner member, each of said passages being in a plane separate from any plane that includes said axis; and an outer member connected to said head member, one of said inner and outer members having grooves cooperating with the surface of the other of such members in forming discharge passages terminating within said outer member, said inner member having passages connecting said discharge passages to said mixing chamber and said inner member projecting within said outer member beyond the ends of said discharge passages.

3. In a torch tip, the combination of: a head member; an inner member providing a discharge passage for combustion supporting gas and having means cooperating with said head member in the provision of a receiving chamber and a mixing chamber with passages therebetween, said passages being inclined to the axis of said inner member and none of said passages being in a plane that includes said axis; and an outer member, one of said inner and outer members having grooves cooperating with the surface of the other of such members in forming discharge passages having converging portions and terminating within said outer member, said inner member having therein passages connecting said discharge passages to said mixing chamber, said inner member projecting within said outer member beyond the ends of said discharge passages, the wall of said projecting portion of said inner member making a greater angle with the axis of said inner member than the walls of said discharge passages.

4. In a torch construction, the combination of: a head member providing a combustible gas passage and a combustion supporting gas passage; an inner member having a frusto-conical end and means cooperating with said head member in providing a mixing chamber communicating with said combustible gas passage, one of said members having grooves therein cooperating with the other of said members to form small circumferentially spaced passages connecting said combustion supporting gas passage and said mixing chamber; and an outer sleeve disposed around said inner member, said sleeve and said inner member providing therebetween discharge passages formed by grooves in said inner member and the inner wall of said sleeve, said inner member having therein passages connecting said discharge passages to said mixing chamber, said discharge passages converging throughout a portion of their length so that the jets of gas discharged from said discharge passages converge beyond said outer member, said discharge passages terminating within said outer member.

5. In a torch tip construction, the combination of: a head member providing a combustible gas passage and combustion supporting gas passages; an inner member having a frusto-conical end portion and an interior combustion supporting gas discharge passage communicating with one of said combustion supporting gas passages and extending to the discharge end of said inner member, said inner member having means cooperating with said head member in providing a mixing chamber communicating with said combustible gas passage, said inner member having connecting passages communicating with said mixing chamber; projections on one of said members engaging the other of said members and providing small circumferentially spaced passages connecting said mixing chamber with the other of said combustion supporting gas passages; and an outer sleeve member disposed around said inner member, one of said members having projections engaging the other of said members and defining discharge passages communicating with said connecting passages and converging near their discharge ends, said discharge passages terminating within said outer sleeve member in back of said frusto-conical end portion and being spaced around said frusto-conical end portion of said inner member.

6. In a torch tip construction, the combination of: a head member providing a primary passage and two secondary passages; an inner member having a frusto-conical end and a central discharge passage communicating with one of said secondary passages, said inner member having portions engaging said head member and defining an annular mixing chamber communicating with said primary passage; projections on said inner member engaging said head member and defining a plurality of small passages connecting the other of said secondary passages with said mixing chamber, said small passages being inclined to the axis of said member, and each of said passages being outside of any plane including said axis; and an outer cylindrical sleeve member having a bore tapered at its forward end, said sleeve member being associated with said inner member, there being grooves in one of said members defining with the other of said members discharge passages and sloped in a portion of their length to discharge jets converging beyond said sleeve member, said discharge passages terminating within said sleeve member and in back of said frusto-conical end, said inner member having therein passages connecting said mixing chamber and said discharge passages.

7. In a torch construction, the combination of: a supporting member; an inner member having means cooperating with said supporting member in the provision of a receiving chamber and a mixing chamber with passages therebetween, said passages being inclined relative to the axis of said inner member, none of said passages being in a plane which includes said axis; and an outer member connected to said supporting member, said outer and inner members providing discharge passages therebetween by projections on one of said members engaging the other of said members, said discharge passages terminating within said outer member, said discharge passages converging throughout a portion of their length and said inner member projecting within said outer member beyond the ends of said discharge passages, said inner member having passages therein connecting said discharge passages to said mixing chamber.

ROY THOMAS.

CERTIFICATE OF CORRECTION.

Patent No. 1,977,782.            October 23, 1934.

ROY THOMAS.

It is hereby certified that error appears in the printed specification of the above numbered patent requiring correction as follows: Page 3, line 64, claim 1, after "forming" insert the word discharge; and that the said Letters Patent should be read with this correction therein that the same may conform to the record of the case in the Patent Office.

Signed and sealed this 13th day of November, A. D. 1934.

Leslie Frazer (Seal)

Acting Commissioner of Patents.

connecting said mixing chamber with the other of said combustion supporting gas passages; and an outer sleeve member disposed around said inner member, one of said members having projections engaging the other of said members and defining discharge passages communicating with said connecting passages and converging near their discharge ends, said discharge passages terminating within said outer sleeve member in back of said frusto-conical end portion and being spaced around said frusto-conical end portion of said inner member.

6. In a torch tip construction, the combination of: a head member providing a primary passage and two secondary passages; an inner member having a frusto-conical end and a central discharge passage communicating with one of said secondary passages, said inner member having portions engaging said head member and defining an annular mixing chamber communicating with said primary passage; projections on said inner member engaging said head member and defining a plurality of small passages connecting the other of said secondary passages with said mixing chamber, said small passages being inclined to the axis of said member, and each of said passages being outside of any plane including said axis; and an outer cylindrical sleeve member having a bore tapered at its forward end, said sleeve member being associated with said inner member, there being grooves in one of said members defining with the other of said members discharge passages and sloped in a portion of their length to discharge jets converging beyond said sleeve member, said discharge passages terminating within said sleeve member and in back of said frusto-conical end, said inner member having therein passages connecting said mixing chamber and said discharge passages.

7. In a torch construction, the combination of: a supporting member; an inner member having means cooperating with said supporting member in the provision of a receiving chamber and a mixing chamber with passages therebetween, said passages being inclined relative to the axis of said inner member, none of said passages being in a plane which includes said axis; and an outer member connected to said supporting member, said outer and inner members providing discharge passages therebetween by projections on one of said members engaging the other of said members, said discharge passages terminating within said outer member, said discharge passages converging throughout a portion of their length and said inner member projecting within said outer member beyond the ends of said discharge passages, said inner member having passages therein connecting said discharge passages to said mixing chamber.

ROY THOMAS.

CERTIFICATE OF CORRECTION.

Patent No. 1,977,782.     October 23, 1934.

ROY THOMAS.

It is hereby certified that error appears in the printed specification of the above numbered patent requiring correction as follows: Page 3, line 64, claim 1, after "forming" insert the word discharge; and that the said Letters Patent should be read with this correction therein that the same may conform to the record of the case in the Patent Office.

Signed and sealed this 13th day of November, A. D. 1934.

Leslie Frazer (Seal)     Acting Commissioner of Patents.